(12) United States Patent
Kelly

(10) Patent No.: US 6,381,938 B1
(45) Date of Patent: May 7, 2002

(54) STAGGERED TINE RAKE CONSTRUCTION

(76) Inventor: William G. Kelly, 5801 Slates Rd., Sutherland, VA (US) 23885

( * ) Notice: Subject to any disclaimer, the term of this patent is extended or adjusted under 35 U.S.C. 154(b) by 0 days.

(21) Appl. No.: 09/798,740

(22) Filed: Mar. 2, 2001

(51) Int. Cl.[7] .................................................. A01D 7/02
(52) U.S. Cl. ...................................................... 56/400.16
(58) Field of Search .......................... 56/400.01, 400.04, 56/400.16, 400.21; D8/13

(56) References Cited

U.S. PATENT DOCUMENTS

| | | | | |
|---|---|---|---|---|
| 3,332,223 A | * | 7/1967 | Polisso | |
| 4,037,397 A | * | 7/1977 | Fiorentino | |
| 4,057,953 A | | 11/1977 | Rugg | |
| 5,033,261 A | | 7/1991 | Bonnes et al. | |
| 5,099,638 A | * | 3/1992 | Bass | |
| 5,241,812 A | | 9/1993 | Crippen | |
| D341,756 S | * | 11/1993 | Bass | |
| 5,934,057 A | | 8/1999 | Daniels et al. | |

* cited by examiner

Primary Examiner—H. Shackelford
(74) Attorney, Agent, or Firm—Henderson & Sturm LLP

(57) ABSTRACT

A staggered tine rake construction (10) including an elongated handle member (20) having a lower end (22) operatively connected to both a front (12) and rear (13) rake unit wherein both rake units (12) and (13) include rake members (30) (30') having mounting sockets (31) (31') which captively engage the upper ends of a plurality of rake tines (32) (32') whose intermediate portions are connected to spacer bars (33) (33') which are spaced from one another by a spacer collar (42); wherein, the first plurality of tines (32) and the second plurality of tines (32') are both laterally and horizontally offset relative to one another to produce a staggered tine array.

7 Claims, 1 Drawing Sheet

STAGGERED TINE RAKE CONSTRUCTION

BACKGROUND OF THE INVENTION

1. Field of the Invention

The present invention relates to the field of garden rake constructions in general and in particular to a fore and aft staggered array of the tines on a rake head.

2. Description of Related Art

As can be seen by reference to the following U.S. Pat. Nos. 4,057,953; 5,033,261; 5,241,812; and 5,934,057, the prior art is replete with myriad and diverse rake constructions.

While all of the aforementioned prior art constructions are more than adequate for the basic purpose and function for which they have been specifically designed, they are uniformly deficient with respect to their failure to provide a simple, efficient, and practical rake construction that insures that each sweep of the rake collects the maximum amount of leaves and debris possible.

As most homeowners and gardeners are aware, there are no commercially available garden rakes that are more than marginally efficient in collecting all of the leaves and debris in a single sweep of the rake.

In addition, this phenomenon is particularly noticeable in those geographic areas that have mast crops such as acorns or the like; wherein, the spacing between the tines of the heads of a conventional rake allows a large portion of the acorns, etc., to pass through the tines in a single pass.

As a consequence of the foregoing situation, there has existed a longstanding need for a new and improved rake construction which employs a novel staggered tine array that effectively captures leaves and debris in a single pass; and, the provision of such a construction is the stated objective of the present invention.

BRIEF SUMMARY OF THE INVENTION

Briefly stated, the staggered tine rake construction that forms the basis of the present invention comprises in general a handle unit, a front rake unit, a rear rake unit and a mounting unit for securing the front rake unit to the rear rake unit.

As will be explained in greater detail further on in the specification, both the front and rear rake units share the same basic construction including a mounting socket that captively engages one end of a plurality of rake tines whose intermediate portions are engaged by a spreader bar which equally spaces the tines from one another.

In addition, the heart of this invention involves not only the front to rear spacing of the respective set of tines on both the front and rear rake units, but more importantly the fact that the rear set of tines is laterally offset from the front set of tines such that each rear tine is disposed intermediate a pair of front tines and vice versa.

As a result of this arrangement, any debris or leaves that are not captured by the rear set of tines will in all probability contact and be caught by the front set of tines. Furthermore, as debris and leaves accumulate between the front and rear rake units, the probability increases that all of the debris in the path of the rake construction will be gathered up in one pass as opposed to the multiple passes required by rakes having a single set of generally aligned tines.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
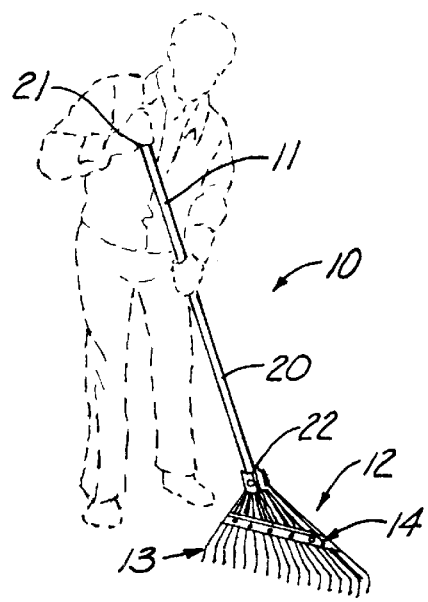
FIG. 1 is a perspective view of the staggered tine rake construction of this invention in use.

As can be seen by reference to the drawings, and in particular to FIG. 1, the staggered tine rake construction, that forms the basis of the present invention is designated generally by the reference number 10. The construction 10 comprises in general a handle unit 11 a front rake unit 12 a rear rake unit 13 and a securing unit 14 for attaching the front 12 and rear 13 rake units together. These units will now be described in seriatim fashion.

As shown in FIG. 1, the handle unit 11 comprises an elongated handle member 20 having an upper end 21 and a lower end 22 wherein the handle member 20 is of a conventional construction and is fabricated from wood or plastic.

Figure 2:
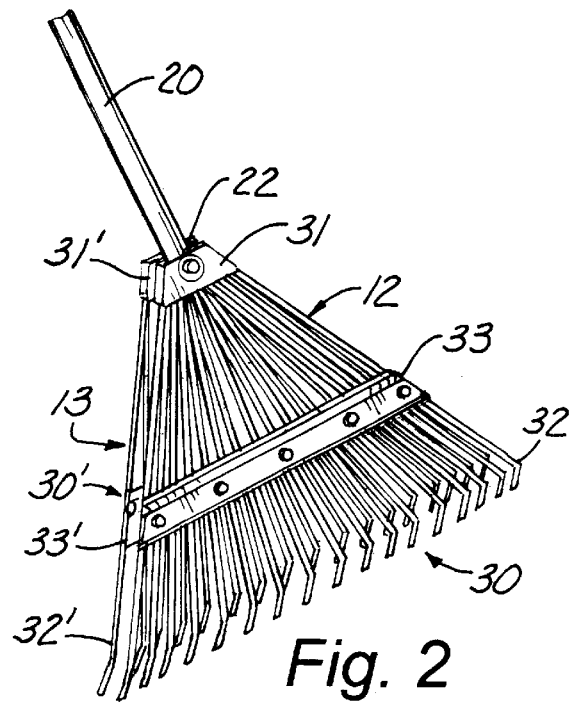
FIG. 2 is a perspective view of the lower portion of the rake construction.
Figure 3:
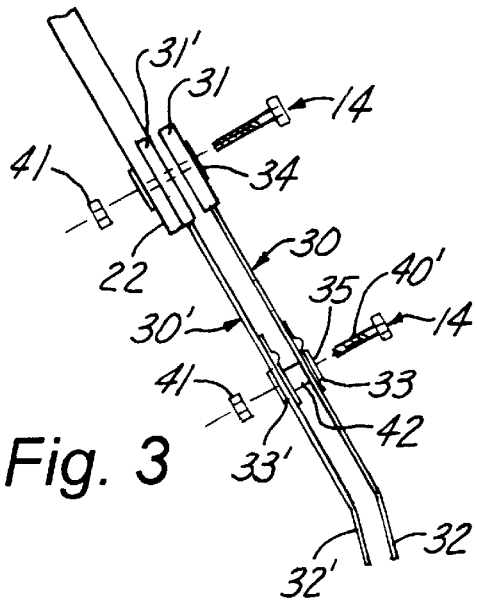
FIG. 3 is an exploded side perspective view of the lower portion of the rake construction.
Figure 4:
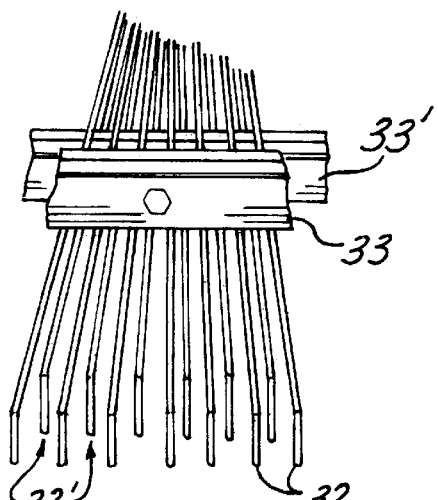
FIG. 4 is an isolated detail view of the laterally staggered relationship between the front and rear rake units.

As can best be appreciated by reference to FIGS. 2 through 4, both the front 12 and rear 13 rake units have the same basic construction which define the rake members 30 and 30' respectively. Each rake member 30, 30' has a mounting socket 31, 31' which captively engages one end of a plurality of rake tines 32, 32' whose intermediate portions are secured in a well recognized fashion to a spreader bar 33, 33' such that the respective plurality of tines 32, 32' are equally spaced from one another and wherein the spacing of the plurality of tines 32, 32' is generally the same for reasons that will be explained presently.

In addition, as can best be appreciated by reference to FIG. 3, both of the mounting sockets 31, 31' are provided with an alignable mounting aperture 34 and the spreader bars 33, 33' are likewise provided with an alignable spacing aperture 35; whereas, the lower end 22 of the handled member 20 is provided with a recess 23 dimensioned to receive the mounting socket 31' of the rear rake unit 13.

Still referring to FIG. 3, it can be seen that the securing unit 14 includes a pair of threaded fasteners 40, 40' having cooperating locking nuts 41 and a spacer collar 42; wherein one of the fasteners 40 is dimensioned to be received through the mounting aperture 34 for securing the mounting sockets 31, 31' to the lower end 22 of the handle member 20 and the other of the fasteners 40 is dimensioned to be received both through the spreader aperture 35 in the spreader bars 33, 33' and the spacer collar 42 which maintains the spreader bars 33, 33' at a fixed distance relative to one another.

As can best be seen by reference to FIG. 4, the key feature of this invention is not only the horizontal spacing between the tines 32, 32' on the front and rear rake members 30 and 30', but also the lateral displacement between the tines 32 on the front rake member 30 and the tines 32 on the rear rake member such that the tines 32' are disposed intermediate the gap between the tines 32.

As a consequence of the foregoing situation, any leaves or debris that passes through the tines 32' on the rear rake member 30 will of necessity contact the tines 32 on the front rake member 30 and as leaves and debris become trapped between the tines 32, 32' on both rake members 30, 30', the open space between the respective sets of tines 32, 32' will become smaller on both an individual and a combined basis to virtually preclude the possibility that any leaves or debris can pass through the progressively restricted openings between the two sets of tines 32, 32'.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

I claim:

1. A rake construction comprising:
    a handle unit including an elongated handle member having an upper end and a lower end;
    a front rake unit including a first plurality of tines, each having an upper end associated with the lower end of the handle member, an intermediate portion affixed to a first spreader bar and a lower end, wherein the lower ends of the first plurality of tines are generally equally spaced from one another; and
    a rear rake unit including a second plurality of tines, each having an upper end associated with the lower end of the handle member, an intermediate portion affixed to a second spreader bar and a lower end, wherein, the lower ends of the second plurality of tines are generally equally spaced from one another as well as the lower ends of the first plurality of tines;
    and wherein the first spreader bar is fixed to the second spreader bar.

2. The rake construction as in claim 1, wherein said first and second plurality of tines are laterally spaced relative to one another.

3. The rake construction as in claim 1, wherein said first and second plurality of tines are horizontally spaced relative to one another.

4. The rake construction as in claim 1, wherein said first and second plurality of tines are both horizontally and laterally spaced from one another.

5. The rake construction as in claim 1, wherein the upper end of the front rake unit is directly connected to the upper end of the rear rake unit.

6. The rake construction as in claim 1, wherein said front rake unit includes a mounting socket connected to the upper end of the first plurality of tines and a first spreader bar connected to the intermediate portion of the first plurality of tines; and the rear rake unit includes a mounting socket connected to the upper end of the second plurality of tines and second spreader bar connected to the intermediate portion of the second spreader bar.

7. The rake construction as in claim 6, wherein said first spreader bar is spaced from the second spreader bar by at least one spreader collar that is disposed intermediate the first and second spreader bars.

* * * * *